(12) United States Patent　　　(10) Patent No.:　US 12,587,885 B2

Mutheevi　　　(45) Date of Patent:　Mar. 24, 2026

(54) CONTROL UNIT RECOVERY MANAGEMENT IN 5G STAND-ALONE TELECOMMUNICATIONS NETWORKS

(71) Applicant: DISH Network Technologies India Private Limited, Bangalore (IN)

(72) Inventor: Alivelu Venkata Neelima Mutheevi, Hyderabad (IN)

(73) Assignee: DISH Network Technologies India Private Limited, Bangalore (IN)

( * ) Notice: Subject to any disclaimer, the term of this patent is extended or adjusted under 35 U.S.C. 154(b) by 352 days.

(21) Appl. No.: 18/394,887

(22) Filed: Dec. 22, 2023

(65) Prior Publication Data

US 2025/0212029 A1　　Jun. 26, 2025

(51) Int. Cl.
| | |
|---|---|
| *H04W 24/08* | (2009.01) |
| *H04L 43/062* | (2022.01) |
| *H04L 43/0817* | (2022.01) |
| *H04W 24/04* | (2009.01) |

(52) U.S. Cl.
CPC .......... *H04W 24/08* (2013.01); *H04L 43/062* (2013.01); *H04L 43/0817* (2013.01); *H04W 24/04* (2013.01)

(58) Field of Classification Search
CPC .... H04W 24/08; H04W 24/04; H04L 43/062; H04L 43/0817
See application file for complete search history.

(56) References Cited

U.S. PATENT DOCUMENTS

| | | | |
|---|---|---|---|
| 2024/0070040 A1* | 2/2024 | Viswanath | .......... G06F 11/2221 |
| 2025/0008345 A1* | 1/2025 | Singh | .................... H04W 24/02 |
| 2025/0211508 A1* | 6/2025 | Mutheevi | ................ H04L 43/10 |
| 2025/0211668 A1* | 6/2025 | Mutheevi | ................ H04M 1/56 |

* cited by examiner

*Primary Examiner* — Duc C Ho

(74) *Attorney, Agent, or Firm* — Quarles & Brady, LLP

(57) ABSTRACT

Systems and methods of managing control unit recovery in a telecommunications network perform or include: initializing a script; receiving an input including at least one of an input type, an input target, a log prefix, or a CU module; executing a pre-restart health check based on the input; rebooting one or more pods based on the input; executing a post-restart health check based on the input; determining a recovery status based on the pre-restart health check and/or the post-restart health check; and generating an output report based on the recovery status.

20 Claims, 8 Drawing Sheets

402    Authenticating User

400

404    Initializing Script

406    Receiving Input

408    Executing Pre-Restart Check

410    Performing Reboot

412    Executing Post-Restart Check

414    Determining Recovery Status

416    Generating Output Report

| AWS | Region | Market | AOI | BEDC Cluster Name | gNB ID | CU CP ID | CU UP ID | Module to Restart |
|---|---|---|---|---|---|---|---|---|
| East-2 | South | Houston | HOU | mv-bedc-eks-cluster-prod-use1iahb212p1-01 | 561005 | 561005000 | 561005100 | cuup |

505 510 515 520 525 530 535 540 545

500

600

| Module | Micro_service | Status | Num of Reboots | Age | EC2 Instance |
|--------|---------------|--------|----------------|-----|--------------|
| cuup | bccsvc-76586867b5-l6ss5 | 2/2 Running | 0 | 14d | ip-xxx-xxx-xxx-xxx.ec2.internal |
| cuup | etcd-0 | 1/1 Running | 0 | 14d | ip-xxx-xxx-xxx-xxx.ec2.internal |
| cuup | gwsvc-6864c7f4c9-nxxkl | 2/2 Running | 0 | 14d | ip-xxx-xxx-xxx-xxx.ec2.internal |
| cuup | intfmgrsvc-68445b9568-k5t48 | 2/2 Running | 0 | 14d | ip-xxx-xxx-xxx-xxx.ec2.internal |
| cuup | iwfsvc-587f57fb7f-5djhb | 2/2 Running | 0 | 14d | ip-xxx-xxx-xxx-xxx.ec2.internal |
| cuup | srmsvc-66f6b8c86c-75gj4 | 2/2 Running | 0 | 14d | ip-xxx-xxx-xxx-xxx.ec2.internal |

| Module | Micro_service | Status | Num of Reboots | Age | EC2 Instance |
|--------|---------------|--------|----------------|-----|--------------|
| cuup | bccsvc-765868867b5-cmyjj | 2/2 Running | 0 | 98s | ip-xxx-xxx-xxx-xxx.ec2.internal |
| cuup | etcd-0 | 1/1 Running | 0 | 96s | ip-xxx-xxx-xxx-xxx.ec2.internal |
| cuup | gwsvc-6864c7f4c9-zf5tp | 2/2 Running | 0 | 98s | ip-xxx-xxx-xxx-xxx.ec2.internal |
| cuup | intfmgrsvc-68445b9568-rkcwk | 2/2 Running | 0 | 97s | ip-xxx-xxx-xxx-xxx.ec2.internal |
| cuup | iwfsvc-587f57fb7f-25574 | 2/2 Running | 0 | 97s | ip-xxx-xxx-xxx-xxx.ec2.internal |
| cuup | srmsvc-66f6b8c86c-zk9c7 | 2/2 Running | 0 | 97s | ip-xxx-xxx-xxx-xxx.ec2.internal |

Processor

802

Memory

804

I/O

806

CONTROL UNIT RECOVERY MANAGEMENT IN 5G STAND-ALONE TELECOMMUNICATIONS NETWORKS

BACKGROUND

This disclosure relates to wireless data networks, such as fifth generation (5G) wireless networks. Wireless networks that transport digital data and telephone calls are becoming increasingly sophisticated. Currently, 5G broadband cellular networks are being deployed around the world. These 5G networks use emerging technologies to support data and voice communications with millions, if not billions, of mobile phones, computers, and other devices. 5G technologies are capable of supplying much greater bandwidths than previously-available technologies.

The discussion above is merely provided for general background information and is not intended to be used as an aid in determining the scope of the claimed subject matter.

SUMMARY

Various aspects of the present disclosure relate to systems and methods in a virtualized telecommunications network to monitor, analyze, and manage control unit recovery management in an automated manner.

According to one aspect of the present disclosure, a method of managing control unit (CU) recovery in a telecommunications network is provided. The method may comprise: initializing, with a processing system including at least one electronic processor, a script for a control unit (CU) of a telecommunication network; receiving, with the processing system, an input, the input including a target network entity and a first CU plane; executing, with the processing system, a first health check for a plurality of pods of the CU for the target network entity, wherein the plurality of pods are within the first CU plane; rebooting, with the processing system, the plurality of pods; executing, with the processing system, a second health check for the plurality of pods; determining, with the processing system, a recovery status for the plurality of pods based on the first health check and the second health check; and generating, with the processing system, an output report, the output report including the recovery status.

According to another aspect of the present disclosure, a telecommunications network is provided. The telecommunications network comprises a wireless access point configured to communicate with a user equipment; and a virtual radio access network (RAN) server operatively connected to the wireless access point, the virtual RAN server configured to: initialize a recovery script associated with a control unit (CU); receive an input, the input including a target network entity and a first CU plane; execute a first iteration of a health check for a plurality of pods of the CU for the target network entity, wherein the plurality of pods is within the first CU plane; after executing the first iteration of the health check, reboot the plurality of pods; execute a second iteration of the health check for the plurality of pods; determine a recovery status for the plurality of pods based on the first iteration and the second iteration of the health check; and generate an output report, the output report including the recovery status.

According to another aspect of the present disclosure, a non-transitory computer-readable medium is provided. The non-transitory computer-readable medium stores instructions that, when executed by at least one processor of a computer in a telecommunications network, cause the computer to perform operations comprising: initializing a script for a control unit (CU) of a telecommunication network; receiving an input, the input including a target network entity and a first CU plane; executing a first health check for a plurality of pods of the CU for the target network entity, wherein the plurality of pods are within the first CU plane; rebooting the plurality of pods; executing a second health check for the plurality of pods; determining a recovery status for the plurality of pods based on the first health check and the second health check; and generating an output report, the output report including the recovery status.

BRIEF DESCRIPTION OF THE DRAWINGS

The following drawings are provided to help illustrate various features of examples of the disclosure and are not intended to limit the scope of the disclosure or exclude alternative implementations.

FIG. 6 illustrates an example output report associated with a pre-restart check according to some configurations.

FIG. 7 illustrates an example output report associated with a post-restart check according to some configurations.

DETAILED DESCRIPTION

Figure 1:
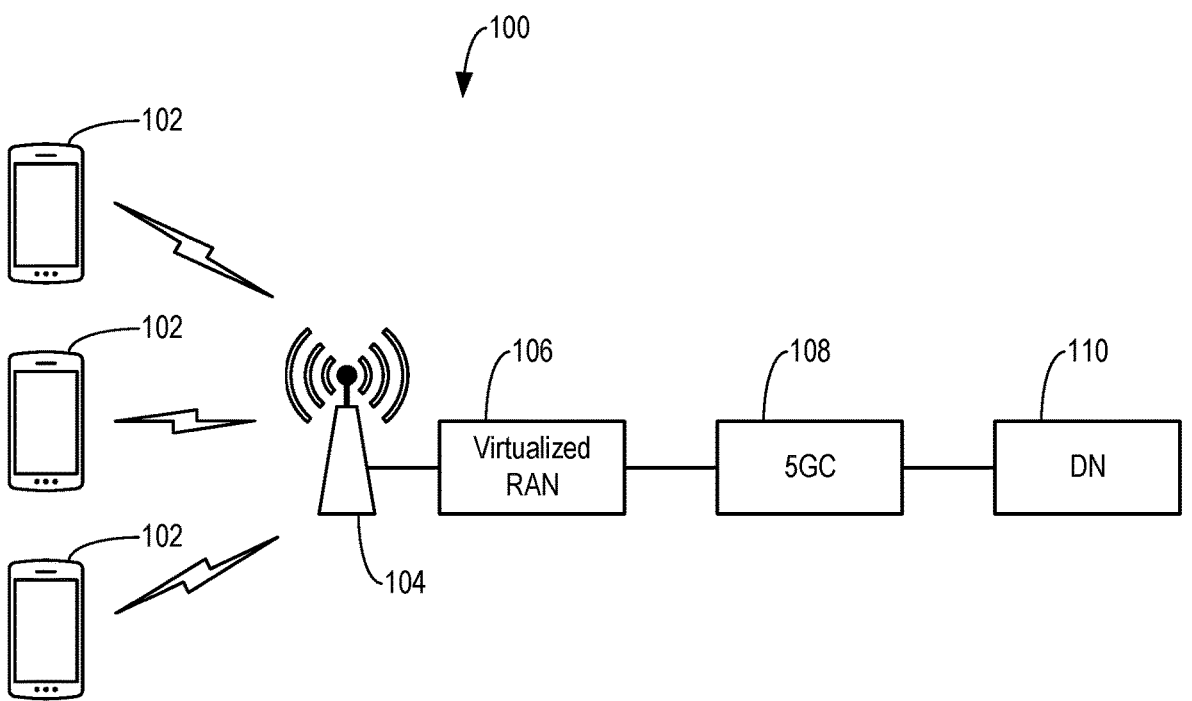
FIG. 1 illustrates an example of a telecommunications network in accordance with various aspects of the present disclosure.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways. The terminology in this document is used for the purpose of description and should not be regarded as limiting. Words such as "including," "comprising," and "having" and variations thereof as used herein are meant to encompass the items listed thereafter, equivalents thereof, as well as additional items.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more electronic processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

The present disclosure is directed to wireless communications networks, also referred to herein as telecommunications networks. The wireless communications networks described herein may represent a portion of a wireless network built around 5G standards promulgated by standards setting organizations under the umbrella of the Third Generation Partnership Project ("3GPP"). Accordingly, in some configurations, the wireless communication network may be a 5G network, such as, e.g., a 5G cellular network. Such 5G networks, including the wireless communication networks described herein, may comply with industry standards, such as, e.g., the Open Radio Access Network (Open RAN or O-RAN) standard that describes interactions between the network and user equipment (e.g., mobile phones and the like).

The O-RAN model follows a virtualized model for a 5G wireless architecture in which 5G base stations, referred to as next-generation Node Bs (gNBs), are implemented using separate centralized units (CUs), distributed units (DUs), and radio units (RUs). In some configurations, O-RAN CUs and DUs may be implemented using software modules executed by distributed (e.g., cloud) computing hardware. Virtualization allows for various other components of the cellular network, such as cellular network core functions, to be implemented as code that is executed using general-purpose computing resources. Such general-purpose computing resources can be part of a public cloud-computing platform that provides virtual private clouds (VPCs) for multiple clients. On a hybrid cloud cellular network, RAN components of the cellular network are in communication with components of the cellular network executed on a public cloud computing platform, such as Amazon Web Services (AWS).

The technology disclosed herein provides a script for executing health checks for a CU, including, e.g., pre-restart health checks, post-restart health checks, etc. Accordingly, the technology disclosed herein may provide recovery script(s) for executing one or more health checks for the CU to determine a recovery status associated with a reboot or restart of one or more pods of the CU. In some configurations, the health checks may include one or more pre-restart health checks, post-restart health checks, or a combination thereof based on an input. The input may include, e.g., one or more target network entities at any desired granularity (e.g., a specific gNB, region, market, AOI, etc.), one or more target CU modules or plane types (e.g., a CU UP module, a CU CP module, or a combination thereof), etc.

Restarts (or reboots) involving the CU are generally attempted manually, which involves significant man-hours and introduces human error. The technology described herein provides, among other things, automated CU restarts integrated with pre- and post-restart health checks, which greatly reduces man-hours for restarts (e.g., by approximately 80% in some instances), detects issues with restarts, and avoids manual errors that may otherwise be introduced. For instance, with the technology disclosed herein, the script may enable multiple automated restart attempts (e.g., such as when an error is encountered) timing out (as opposed to manually having to attempt each of the multiple restarts). Further, the technology disclosed herein may enable execution of the script on multiple CUs at a time (e.g., 16 CUs at the same time), which significantly reduces execution time.

FIG. 1 illustrates an example of a telecommunications network 100 in accordance with various aspects of the present disclosure. In the telecommunications network 100 of FIG. 1, a plurality of user equipment (UEs) 102 are connected to a wireless access point 104, which in turn is connected to a set of virtualized radio access network (RAN) components 106. The virtualized RAN components 106 provide a connection to a 5G core network (5GC) 108, which in turn provides a connection to a data network 110. The wireless access point 104 and the virtualized RAN components 106 may collectively be referred to as a next-generation RAN (NG-RAN).

In some configurations, the telecommunications network 100 may be a standalone (SA) network (e.g., a 5G SA network) that utilizes 5G cells for both signaling and information transfer via a 5G packet core architecture. However, the present disclosure may be implemented with any type of telecommunication network capable of being virtualized.

As used herein, the term "UE" may be one of various types of end-user devices, such as cellular phones, smartphones, cellular modems, cellular-enabled computerized devices, sensor devices, robotic equipment, vehicles, IoT devices, gaming devices, access points (APs), or any computerized device capable of communicating via a cellular network. More generally, a UE 102 can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, a UE 102 may use RF to communicate with various base stations of a telecommunications network. While FIG. 1 illustrates three UEs 102 connected to the wireless access point 104, in practical implementations any number of UEs 102 may be connected to the wireless access point 104 at any given time.

The wireless access point 104 represents the physical infrastructure (e.g., a 5G tower) to which the UEs 102 connect. The wireless access point 104 may be any structure to which one or more antennas are mounted. The wireless access point 104 may be a dedicated cellular tower, a building, a water tower, or any other man-made or natural structure to which one or more antennas can reasonably be mounted to provide cellular coverage to a geographic area. The wireless access point 104 may include an RU configured to convert radio signals sent to and received from the antenna(s) into a digital signal. The wireless access point 104 is connected to the virtualized RAN components 106 via a fronthaul link over which the digital signals may be communicated. The virtualized RAN components 106 may include a DU connected to a CU via a midhaul link. The CU may be connected to the 5GC 108 via a backhaul link. While FIG. 1 illustrates a single wireless access point 104 and a single set of virtualized RAN components 106, in practical implementations the telecommunications network 100 may include any number of wireless access points 104 and/or any number of virtualized RAN components 106.

In one example, the telecommunications network 100 may be configured according to a region-based network topology. For example, the telecommunications network 100 may be implemented using a cloud computing platform that is logically and physically divided up into various different cloud computing regions (e.g., AWS regions). The cloud computing regions may be based on the geographical location of the gNBs; for example, the telecommunications network 100 for a given nation may be divided into a number of geographical regions. Each of the cloud computing regions can be isolated from other cloud computing regions to help provide fault tolerance, fail-over, load-balancing, and/or stability and each of the cloud computing regions can be composed of multiple availability zones or markets, each of which can be a separate data center located in general proximity to each other (e.g., within 100 miles). For example, one cloud computing region may have its datacenters and hardware located in the northeast of the United States while another cloud computing region may have its data centers and hardware located in California.

Each of the availability zones may be a discrete data center or group of data centers that allows for redundancy, thereby to provide fail-over protection from other availability zones within the same cloud computing region. For example, when a particular data center of an availability zone experiences an outage, another data center of the availability zone or separate availability zone within the same cloud computing region can continue functioning and providing service. An availability zone may be divided into multiple local zones or areas-of-interest (AOIs). For instance, a client, such as a provider of the telecommunications network 100, can select from more options of the computing resources that can be reserved at an availability zone compared to a local zone. However, a local zone may provide computing resources nearby geographic locations where an availability zone is not available. Each local zone may be divided into multiple gNBs, each of which can serve one or more sites. A site may have one DU and a number of RUs (e.g., six RUs) assigned to it.

The 5GC 108 provides a plurality of 5G core functions. In the topology of a 5G NR cellular network, 5G core functions of 5GC 108 can logically reside as part of a national data center (NDC). An NDC can be understood as having its functionality existing in a cloud computing region across multiple availability zones. This arrangement allows for load-balancing, redundancy, and fail-over. In local zones, multiple regional data centers can be logically present. Each of regional data centers may execute 5G core functions for a different geographic region or group of RAN components. An example of 5G core components that can be executed within an RDC are described in more detail with regard to FIG. 2. The data network 110 may be the Internet, an enterprise data network, combinations thereof, or the like.

Figure 2:
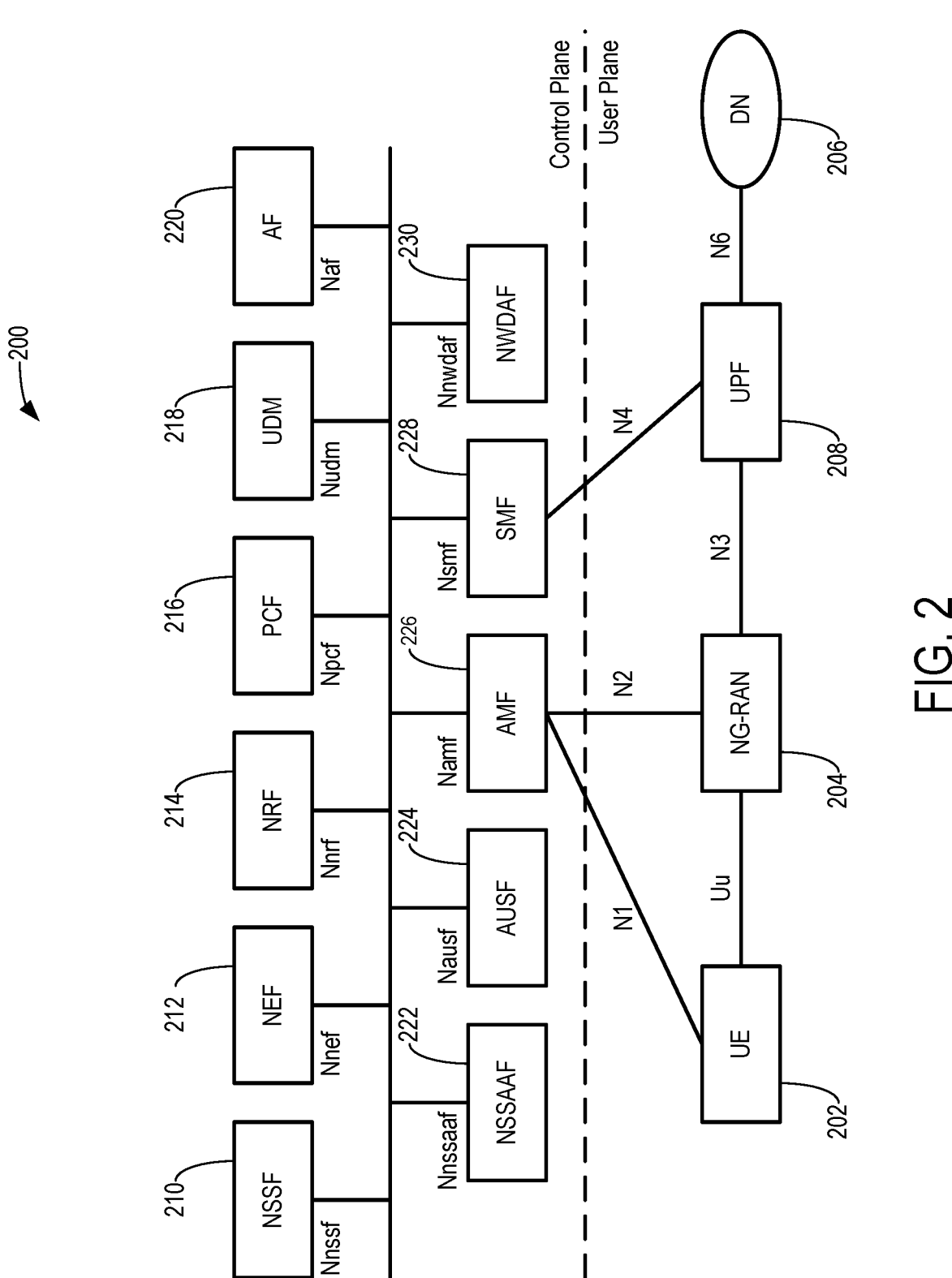
FIG. 2 illustrates an example of a service-based architecture for a telecommunications network in accordance with various aspects of the present disclosure.

FIG. 2 illustrates an example service-based architecture (SBA) 200 for a telecommunications network (e.g., the telecommunications network 100 of FIG. 1) in accordance with various aspects of the present disclosure. The SBA 200 is divided between a control plane (CP) and a user plane (UP). The CP includes a plurality of CP network functions (NFs). The UP includes a UE 202 (e.g., one of the UEs 102 of FIG. 1) connected to an NG-RAN 204, and UP NFs. Using the SBA 200, the UE 202 accesses a data network 206 (e.g., the data network 110 of FIG. 1). For ease of illustration, FIG. 1 only shows a single UE 202 being connected to the NG-RAN 204; however, in practical implementations any number of UEs 202 may be present, limited only by the capacity of the network.

The UP NFs may include a User Plane Function (UPF) 208. The UPF 208 is a NF that routes and forwards user plane data packets between the base station (cell site; for example, the NG-RAN 204) and the data network 206 (e.g., the Internet). The UPF 208 may be similar to the service and packet gateway functions in a 4G network, but the UPF 208 is cloud-native and can be deployed anywhere to meet service requirements. The UPF 208 can also manage, prioritize, and duplicate data packets as those data packets traverse the network, thus offering redundancy and quality-of-service (QoS) assurance.

The CP NFs may include a Network Slice Selection Function (NSSF) 210, a Network Exposure Function (NEF) 212, a Network Repository Function (NRF) 214, a Policy Control Function (PCF) 216, a Unified Data Management (UDM) 218, an Application Function (AF) 220, a Network Slice-specific and SNPN Authentication and Authorization Function (NSSAAF) 222, an Authentication Server Function (AUSF) 224, an Access and Mobility Management Function (AMF) 226, a Session Management Function (SMF) 228, and a Network Data Analytics Function (NWDAF) 230.

The NSSF 210 may be a CP function that provides network slices to the AMF 226. A network slice is an independent, end-to-end logical network that runs on shared physical network infrastructure. The network slice involves the allocation of network resources across all network infrastructure to meet specific service requirements, from the network core to the RAN. Specific requirements may include QoS assurance, security policies, data isolation, dynamic policy management, etc.

The NEF 212 may be a CP function that provides information regarding the NFs that are available to use (by the enterprise customer). The NEF 212 may be similar to the 4G Service Capabilities Exposure Function (SCEF), but the NEF 212 is cloud-native and exposes event information, network monitoring, network control, provisioning capabilities, and policy/charging capabilities externally. This allows the enterprise customer to monitor and affect QoS and charging for devices.

The NRF 214 may be a CP function that allows 5G NFs to be registered, discovered, and subsequently made available to customers. This is a unique capability in the SA 5G network that allows customers to subscribe to the necessary microservices or to have dedicated NFs for their services.

The PCF 216 may be a CP function that provides policies for mobility and session management. The PCF 216 may be similar to the Policy and Charging Rules Function (PCRF) in a 4G network, but the PCF 216 is cloud-native and offers additional capabilities in the 5G network, including event-based policy triggers, resource reservation requests, and access network discovery and selection. The PCF 216 may directly influence QoS and subscriber spending limits, and, as a result, may play a role in the enhanced policy management and control capabilities of the 5G network.

The UDM 218 may be a CP function that manages and stores subscriber and device information, default QoS and prioritization, authorized data channels, maximum bit rates, service continuity provisions, and the like. The UDM 218 may be similar to the Home Subscriber Server (HSS) function in a 5G network, but the UDM 218 is cloud-native and designed for 5G services.

The AF 220 may be a CP function that interacts with the 3GPP Core Network in order to provide services, for example, to support one or more of application function influence on traffic routing, application function influence on service function chaining, accessing the NEF 212, interacting with the PCF 216, time synchronization service, IP multimedia subsystem (IMS) interactions with the 5GC, or packet data unit (PDU) set handling.

The NSSAAF 222 may be a CP function that supports authentication and authorization of slicing with an AAA server (Authentication, Authorization, and Accounting). The NSSAAF 222 may be a unique capability of the SA 5G network that allows customers to access a predefined network slice or a newly requested network slice in real-time (or near real-time) and using their own existing authentication infrastructure.

The AUSF 224 may be a CP function that supports authentication for 3GPP access and untrusted non-3GPP access, and authentication of a UE for a disaster roaming service. The AUSF 224 can act as an authentication server.

The AMF 226 may be a CP function that manages registration, authorization, connection, reachability, and mobility. The AMF 226 may be similar to the Mobility Management Entity (MME) function in a 4G network, but the AMF 226 is cloud-native and supports many additional capabilities unique to 5G. For example, the AMF 226 may also support dynamic updating of network interfaces and cellular sites, greater privacy via the use of a 5G temporary device identity, enhanced security across the user and control planes, and storing of network slice information. The AMF 226 can also select an appropriate PCF for a device or use case.

The SMF 228 may be a CP function that oversees packet data session management, IP address allocation, data tunneling from a cell site base station to the user plane function, and downlink notification management. The SMF 228 may perform the tasks of the serving and packet gateways (S-GW & P-GW) in a 4G network, but also allows for CP and UP separation in 5G.

The NWDAF 230 may be a CP function that collects data from pertinent network infrastructure relevant to a customer's services, including UE (device), NFs, network operations and administration, cloud, and edge that can be used for data analytics and insights. The NWDAF 230 may be a unique SA 5G NF that exposes full visibility to network performance and operations as they relate to a customer's key performance indicators (KPIs).

The SBA 200 may further include a plurality of service-based interfaces to provide access to or communication with the various NFs. As illustrated, such service-based interfaces may include an Nnssf interface for the NSSF 210, an Nnef interface for the NEF 212, an Nnrf interface for the NRF 214, an Npcf interface for the PCF 216, an Nudm interface for the UDM 218, an Naf interface for the AF 220, an Nnssaaf interface for the NSSAAF 222, an Nausf interface for the AUSF 224, an Namf interface for the AMF 226, an Nsmf interface for the SMF 228, and an Nnwdaf interface for the NWDAF 230. FIG. 1 also illustrates several reference points (i.e., interfaces between two NFs or entities), including an N1 interface between the UE 202 and the AMF 226, a Uu interface between the UE 202 and the NG-RAN 204, an N2 interface between the NG-RAN 204 and the AMF 226, an N3 interface between the NG-RAN 204 and the UPF 208, an N4 interface between the UPF 208 and the SMF 228, and an N6 interface between the UPF 208 and the data network 206.

The above-listed NFs and interfaces are intended to be illustrative and not exhaustive. In practical implementations, the SBA 200 may include additional NFs or other network entities, such as an Unstructured Data Storage Function (UDSF), a Network Slice Admission Control Function (NSCAF), a Unified Data Repository (UDR), a UE radio Capability Management Function (UCMF), a 5G-Equipment Identity Register (5G-EIR), a Charging Function (CHF), a Time Sensitive Networking AF (TSN AF), a Time Sensitive Communication and Time Synchronization Function (TSCTSF), a Data Collection Coordination Function (DCCF), an Analytics Data Repository Function (ADRF), a Messaging Framework Adaptor Function (MFAF), a Non- Seamless WLAN Offload Function (NSWOF), an Edge Application Server Discovery Function (EASDF), a Service Communication Proxy (SCP), a Security Edge Protection Proxy (SEPP), a Non-3GPP InterWorking Function (N3IWF), a Trusted Non-3GPP Gateway Function (TNGF), a Wireline Access Gateway Function (W-AGF), or a Trusted WLAN Interworking Function (TWIF).

Any of the NFs illustrated in FIG. 2 and/or described above may be implemented as a software unit residing on a server (i.e., in the cloud). Each NF can include multiple pods. A "pod" may refer to a software sub-component of the NF. Kubernetes, Docker, or some other container orchestration platform can be used to create and destroy the logical CU or 5G core units and subunits as needed for the telecommunications network to function properly. The pods may be deployed on one or more virtual machines configured by a network operator. Kubernetes allows for container deployment, scaling, and management. As an example, when cellular traffic increases substantially in a region, an additional logical CU or components of a CU may be deployed in a data center near where the traffic is occurring without any new hardware being deployed. Instead, processing and storage capabilities of the data center would be devoted to the needed functions. When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers. Thus, the SBA 200 may be implemented on or using one or more computing devices, each of which includes a processor and a memory.

As used herein, a "processor" may include one or more individual electronic processors, each of which may include one or more processing cores, and/or one or more programmable hardware elements. The processor may be or include any type of electronic processing device, including but not limited to central processing units (CPUs), graphics processing units (GPUs), application-specific integrated circuits (ASICs), field-programmable gate arrays (FPGAs), microcontrollers, digital signal processors (DSPs), or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations described herein may be performed by any one or more of the microprocessors or processing cores, in series or parallel, in any combination. In some implementations, one or more of the processing units or processing cores may be remote (e.g., cloud-based).

As used herein, a "memory" may be any storage medium, including a non-volatile medium, e.g., a magnetic media or hard disk, optical storage, or flash memory; a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc.; on-chip memory; and/or an installation medium where appropriate, such as software media, e.g., a CD-ROM, or floppy disks, on which programs may be stored and/or data communications may be buffered. The term "memory" may also include other types of memory or combinations thereof. For the avoidance of doubt, cloud storage is contemplated in the definition of memory. A memory is an example of a non-transitory computer-readable medium which stores instructions that are executable by a processor (or processors), the execution of which causes the executing device (e.g., a computer) to perform certain operations, such as those operations described herein.

Figure 3:
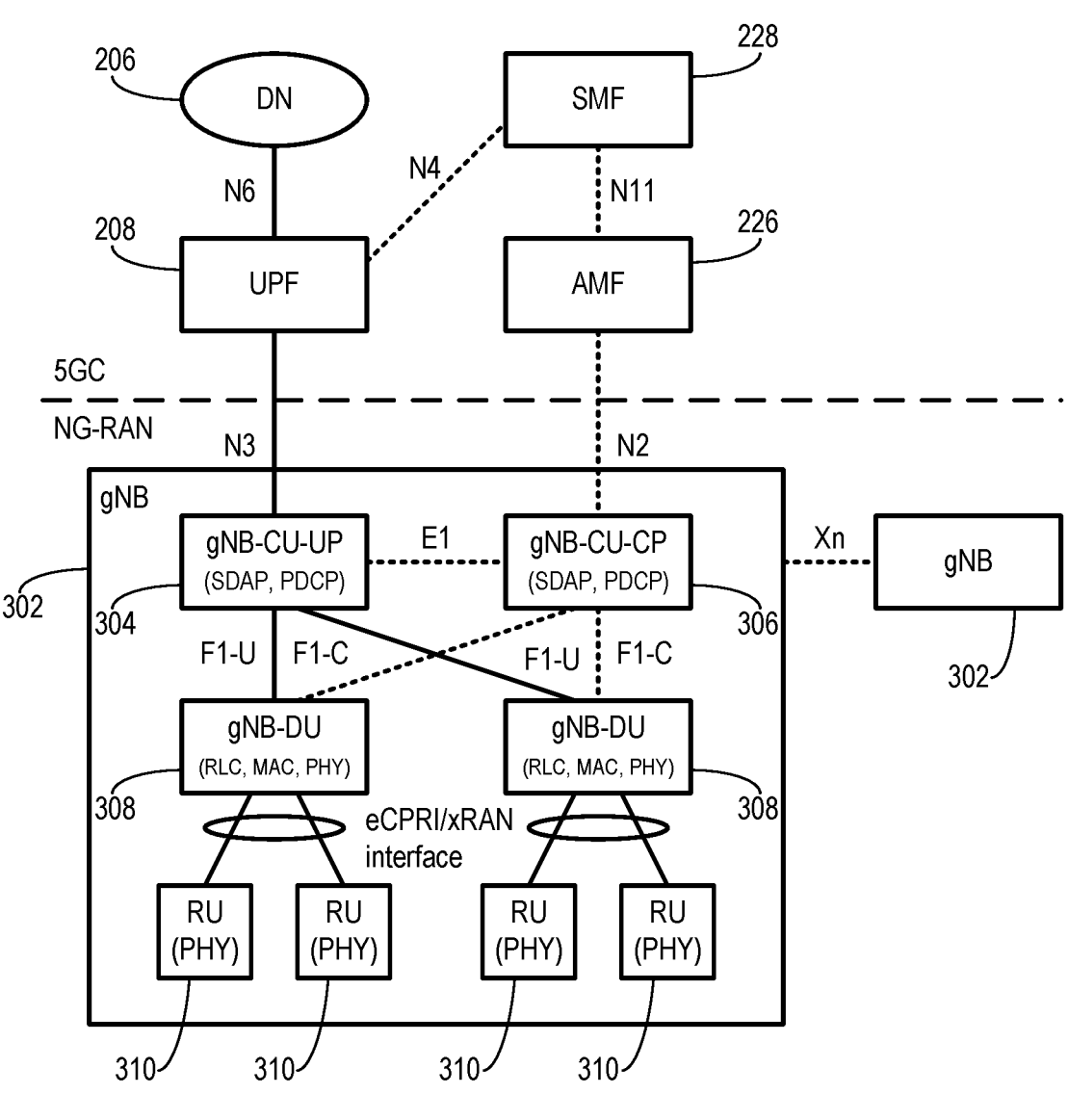
FIG. 3 illustrates an example of a 5G radio access network in accordance with various aspects of the present disclosure.

FIG. 3 illustrates an example of various components of the SBA 200 in more detail. For purposes of clarity and ease of explanation, the UE 202 and components of the 5GC other than the data network 206, the UPF 208, the AMF 226, and the SMF 228 are omitted. The UPF 208 and the SMF 228 are connected to one another via an N4 interface, and the AMF 226 and the SMF 228 are connected to one another via an N11 interface. As illustrated in FIG. 3, the NG-RAN 204 includes a plurality of gNBs 302. Although FIG. 3 illustrates two gNBs 302, in practical implementations any number of gNBs 302 may be present.

The gNB 302 includes a CU divided into a gNB Control Unit User Plane (gNB-CU-UP) 304 and a gNB Control Unit Control Plane (gNB-CU-CP) 306. The gNB-CU-UP 304 is connected to the UPF 208 via an N3 interface, and the gNB-CU-CP 306 is connected to the AMF 226 via an N2 interface (i.e., backhaul links). The gNB 302 further includes a gNB-DU 308, of which two are illustrated although any number of gNB-DUs 308 may be present. The gNB-DU 308 is connected to the gNB-CU-UP 304 via an F1-U interface and is connected to the gNB-CU-CP 306 via an F1-C interface (i.e., midhaul links). In one example, the CU and gNB-DU 308 are developed using the Kubernetes architecture. The gNB 302 may further include an RU 310, of which two per gNB-DU 308 are illustrated although any number of RUs 310 may be present, including different numbers of RUs 310 per gNB-DU 308. The RU 310 is connected to the gNB-DU 308 via an evolved Common Public Radio Interface (eCPRI) connection and/or an xRAN interface (i.e., fronthaul links). The interfaces illustrated in FIG. 3 may be implemented as IP interfaces (i.e., having end-points denoted by IP addresses).

The 5G radio protocol stack may be divided among the CU, the gNB-DU 308, and the RU 310. As illustrated, the gNB-CU-UP 304 and the gNB-CU-CP 306 include the Service Data Adaptation Protocol (SDAP) and the Packet Data Convergence Protocol f (PDCP); the gNB-DU 308 includes the Radio Link Control (RLC) protocol, the Medium Access Control (MAC) protocol, and the Physical Layer (PHY) protocol; and the RU 310 includes the PHY protocol. Data passes through the protocol stack along a path that depends on the data type. Control data (e.g., signaling messages, etc.) pass through the CP including the gNB-CU-CP 306, whereas user data passes through the UP including the gNB-CU-UP 304.

Figure 4:
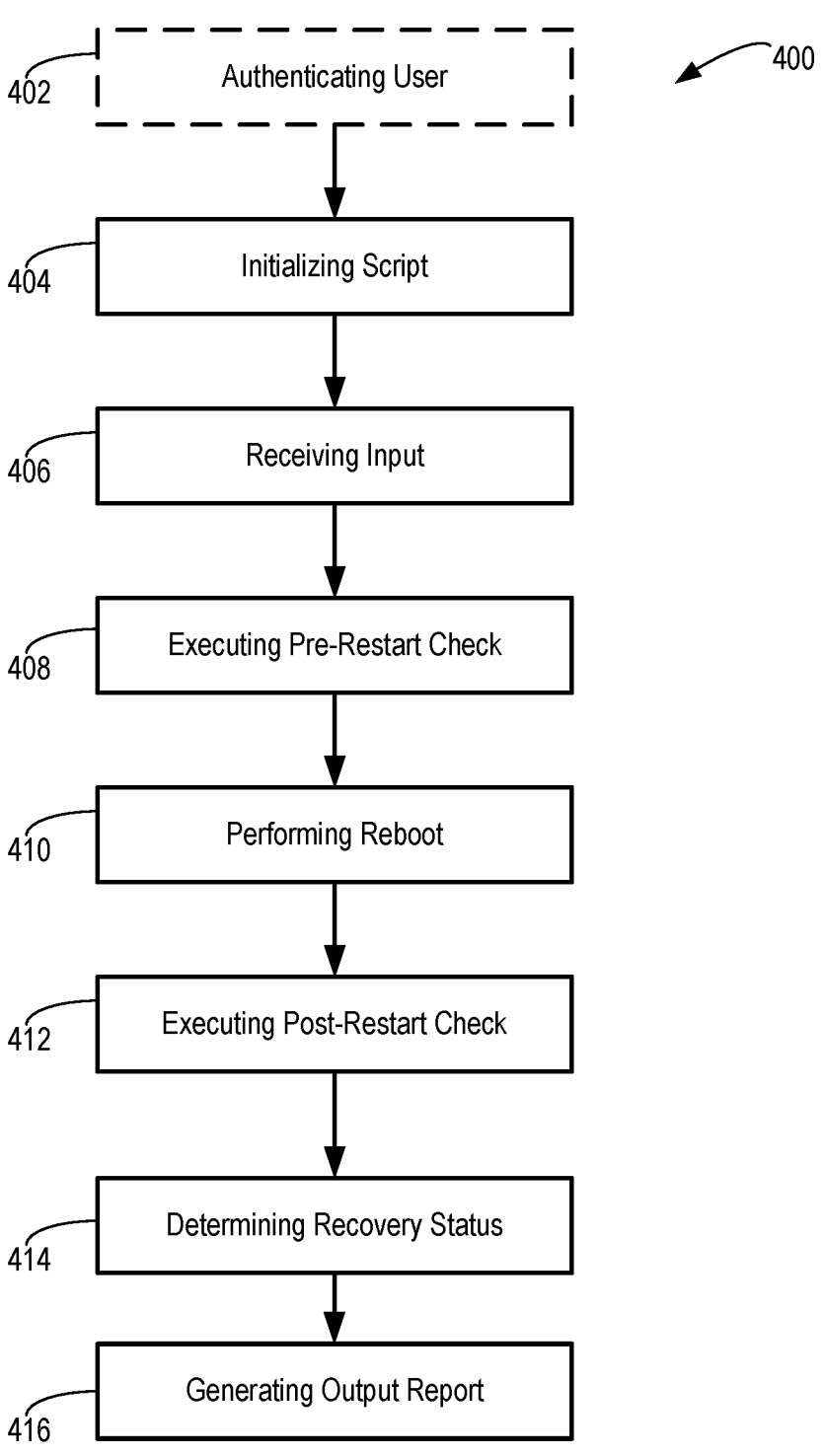
FIG. 4 illustrates an example of a control unit recovery management method in accordance with various aspects of the present disclosure.

Various pods of the NG-RAN 204 (e.g., pods of the gNB-CU-UP 304 and/or of the gNB-CU-CP 306) may be interrogated to implement various network management systems and methods. FIG. 4 illustrates one example of a health check management method 400 in accordance with the present disclosure. For purposes of explanation, FIG. 4 will be described as being implemented in a 5G O-RAN network; however, in practice the method 400 may be implemented with any virtualized RAN architecture. Moreover, for purposes of explanation, FIG. 4 will be described as being implemented in a network operating using AWS with pods using Kubernetes; however, these are merely examples and not limiting. The systems and methods of the present disclosure may be implemented with other web services provider and with other container organization architectures. The method 400 may be performed by a processing system including at least one electronic processor, where the at least one electronic processor may be or include a processor as previously described (e.g., including one or more individual electronic processors). A virtual RAN server (see, e.g., virtual RAN server 800 of FIG. 8 described further below) is an example of such a processing system that may perform the method 400.

The method 400 may be performed under the direction of a user (e.g., a network engineer or other personnel) or may be performed in an automated manner (e.g., automatically at a predetermined interval). In user-directed implementations, the method 400 may begin with an operation 402 of authenticating the user. For example, the user may log on to the vendor and/or a region-specific AWS Elastic Compute Cloud (EC2) instance using the appropriate authentication keys (e.g., username/passwords, one-time codes (OTCs), etc.). Thus, operation 402 may include determining whether a user has entered an appropriate authentication key and, if so, granting the user access. However, even in user-directed implementations, operation 402 may be omitted in certain situations (e.g., when the user has already properly logged on). In automated implementations, operation 402 may also be omitted.

At operation 404, a control unit recovery management script (also referred to herein as the script) may be initialized. The initialization operation may include downloading the script from a database. In the AWS implementation example, the script may be downloaded from a specific Simple Storage Service (S3) bucket. By downloading the script at or near run-time, it can be ensured that the most recent version of the script is used for execution.

At operation 406, an input may be received. In user-directed implementations, the user may manually execute the script by inputting script-specific commands. In automated implementations, the input may be loaded from a local or external memory. In either implementation, the input may include at least one of an input type (e.g., region, market, AOI, gNB, etc.), an input target (e.g., a specific AWS region, one or more specific markets, one or more specific AOIs, one or more specific gNB, etc.) (also referred to herein as a target network entity), and a test identifier (a log prefix). The input may specify any input type and input target combination as desired. The test identifier may be any alphanumeric string which may be prepended to or otherwise concatenated with the outputs of the script (described in more detail below), thereby to allow the outputs of different script executions to be easily differentiated. In some implementations, the input may include one or more CU planes or modules, such as, e.g., a control plane, a user plane, or a combination thereof. In such implementations, the input may include the CU plane(s) or module(s) to be checked or rebooted as part of executing the script.

Figure 5:
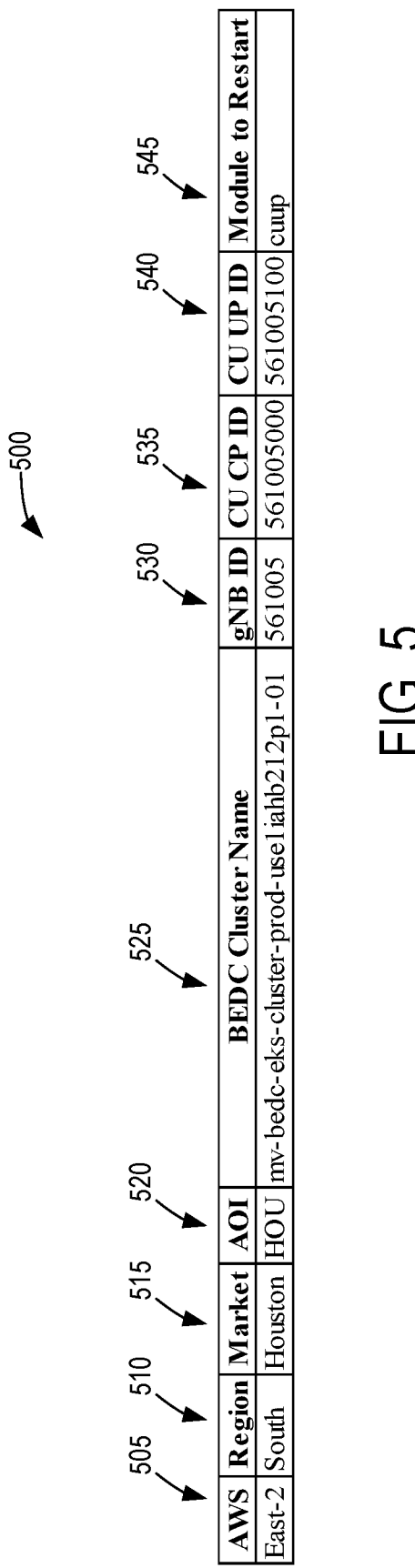
FIG. 5 illustrates an example input for a recovery script according to some configurations.

FIG. 5 illustrates an example input for the script according to some configurations. As illustrated in FIG. 5, the example input may include a specific AWS 505, a region 510, a market 515, an AOI 520, a BEDC Cluster Name 525, a gNB ID 530, a CU CP ID 535, a CU UP ID 540, and a CU module 545 to be restarted or rebooted. In the illustrated example of FIG. 5, the input may have indicated that the script will be executed with respect to the CU UP module (e.g., the CU UP module will be restarted or rebooted via execution of the script).

In some configurations, network data may be retrieved. In some implementations, the network data may be retrieved as part of executing the script or responsive to receiving the input (e.g., at operation 406). Alternatively, the network data may be retrieved independent of execution of the script or receipt of the input. The network data retrieved may be based on the input (e.g., the list of target network entities). For example, the network data may include information or data specific to the input type, the input target, the test identifier, the CU module(s) or plane(s), or a combination thereof. For instance, the network data may include (or otherwise identify) information associated with a specific AWS, a region, a market, an AOI, a BEDC Cluster Name, a gNB ID, a CU CP ID, a CU UP ID, an N2 interface, an AMF IP, an N3 Data IP, an N3 Voice IP, a site ID list, a DU ID list, a FIC IP list, a F1U IP list, etc. The network data from a database, which may be the same as or different than the database queried in operation 404.

At operation 408, a pre-restart check may be executed. The pre-restart check may be executed as part of executing the script. In some instances, the pre-restart check may be executed based on the input (e.g., as received at operation 406). In some implementations, execution of the pre-restart check may include performing (or otherwise executing) one or more health checks with respect to the CU (or another component or components of the network), such as, e.g., a health check for pods of the CU, for the CU module(s) specified in the input. For example, when the input identifies a gNB and indicates CU UP modules or planes, the pre-restart check may be executed to perform one or more health checks of the CU UP modules of the gNB identified in the input (e.g., the CU of the gNB identified in the input).

In some configurations, operation 408 may include executing a pre-restart health check on one or more pods (or microservices) of the CU. The software executed by the CU may include one or more pods. In some instances, the pod(s) may be Kubernetes code modules. The operation 408 may determine a pre-restart health status (e.g., healthy, unhealthy, etc.) associated with the pod(s) of the CU prior to the pod(s) being restarted or rebooted. The pre-restart health check may be executed based on network data, including, e.g., a list of pods (or microservices) of the CU, a CU module type, etc. Accordingly, in some examples, the network data may include a list of microservices or pods associated with the CU based on the input (e.g., a target network entity, a CU module type, etc.).

In some configurations, performance of the pre-restart health check (via execution of the script) for a pod may include determining, for the corresponding pod, one or more of: an associated CU module (e.g., CUCP module or CUUP module); a running status (e.g., a 1/1 running status, a 2/2 running status, etc.); a number of reboots since last instantiated; an age (e.g., 44 days, 3 days 19 hours, etc.); EC2 instance information; or the like (as pre-restart health check output data). In some instances, the pre-restart health check output data may be determined or generated via execution of the pre-restart health check (e.g., execution of the script). Alternatively, or in addition, in some instances, the pre-restart health check output data may be retrieved from storage (e.g., as network data) via execution of the pre-restart health check.

For example, FIG. 6 illustrates an example table 600 of data associated with execution of the pre-restart health check according to some configurations. As illustrated in FIG. 6, the table 600 may include a list of microservices or pods 605 (e.g., as the retrieved network data). The table 600 may also include information associated with or indicating an associated CU module or plane (represented in FIG. 6 by reference numeral 610), a running status (represented in FIG. 6 by reference numeral 615), a number of reboots since last instantiated (represented in FIG. 6 by reference numeral 620), an age (represented in FIG. 6 by reference numeral 625), and EC2 instance information (represented in FIG. 6 by reference numeral 630). The data associated with the pod health check (e.g., the pod health check output data, the network data, etc.) may include additional, different, or less data than described herein, such as, e.g., based on a corresponding network architecture.

In some configurations, execution of the pre-restart health check (e.g., at operation 408) may include determining a pre-restart health status for the pod(s) subject to the pre-restart health check. In some instances, the pre-restart health status may be a "healthy" status (e.g., when the pod(s) subject to the pre-restart health check is healthy or functioning properly or as expected) or a "unhealthy" status (e.g., when the pod(s) subject to the pre-restart health check are not health or functioning improperly or not as expected). In some instances, the pre-restart health status may be determined based on a running state. In some implementations, the pre-restart health status may be based on any combination or single data point included in the pre-restart health check output data. As one example, when the pre-restart health check output data for a pod indicates that a running status for the pod is not running properly (e.g., a running status of 0/1 running or 1/2 running), the pre-restart health status of the pod may be unhealthy.

The pre-restart health check may be completed or end when each pod included in the set of pods have been checked (e.g., a pre-restart health status has been determined for each pod). Alternatively, the pre-restart health check may be completed or end when a pre-restart health status indicates that a pod is unhealthy. When the pre-restart health check is completed, the method 400 may proceed to operation 410, where each pod included in the set of pods is rebooted or restarted.

At operation 412, a post-restart health check may be executed. The post-restart health check may be executed as part of executing the script. In some configurations, the post-restart health check (and the execution thereof) may be similar to the pre-restart health check (and the execution thereof). Accordingly, in some instances, the post-restart health check may be similar to the pre-restart health check but for the post-restart health check occurring after the pod(s) are restarted or rebooted (e.g., after operation 410).

For example, FIG. 7 illustrates an example table 700 of data associated with execution of the post-restart health check according to some configurations (e.g., as post-restart health check output data). As illustrated in FIG. 7, the table 700 includes similar categories of data as illustrated in the table 600 of FIG. 6. However, the data or content for those categories may be different. For instance, the table 700 may include a list of microservices or pods 705. The table 700 may also include information associated with or indicating an associated CU module or plane (represented in FIG. 7 by reference numeral 710), a running status (represented in FIG. 7 by reference numeral 715), a number of reboots since last instantiated (represented in FIG. 7 by reference numeral 720), an age (represented in FIG. 7 by reference numeral 725), and EC2 instance information (represented in FIG. 7 by reference numeral 730). The data associated with the pod health check (e.g., the post-restart health check output data, the network data, etc.) may include additional, different, or less data than described herein, such as, e.g., based on a corresponding network architecture.

At operation 414, a recovery status may be determined. A recovery status may indicate a success or failure for the restart or reboot of the set of pods (e.g., operation 410). The recovery status may be successful when each pod was restarted and, after being restarted, is healthy. The recovery status may be unsuccessful (e.g., a failure) when each pod was not restarted or, after being restarted, one or more pods are unhealthy. The recovery status may be determined based on the pre-restart health check (e.g., the pre-restart health check output data), the post-restart health check (e.g., the post-restart health check output data), or a combination thereof.

In some configurations, the recovery status may be determined based on age data included in the output data (e.g., represented in FIG. 6 by reference numeral 625 and in FIG. 7 by reference numeral 725). For instance, a first set of ages for the pods may be determined based on the pre-restart health check (e.g., the age data included in FIG. 6) and a second set of ages for the pods may be determined based on the post-restart health check. When the first set of ages differs from the second set of ages, the reboot or restart (e.g., operation 410) may have been successful (e.g., a successful recovery status). For example, a pre-restart age of 14 days for a pod and a post-restart age of 38 seconds for the pod may indicate that the pod was restarted. When the first set of ages does not differ from the second set of ages (e.g., by at least a threshold amount), the reboot or restart (e.g., operation 410) may have been unsuccessful (e.g., an unsuccessful recovery status). For example, a pre-restart age of 14 days for a pod and a post-restart age of 14 days for the pod may indicate that the pod was not restarted. Accordingly, in some instances, the recovery status may be determined based on a difference between age data generated by the pre-restart health check and the post-restart health check.

Alternatively, or in addition, in some configurations, the recovery status for the set of pods may be determined based on one or more running statuses. For instance, when the running statuses for the post-restart health check (e.g., as represented in FIG. 7 by reference numeral 715) indicate the pods are healthy, the recovery status may be determined to be healthy. Accordingly, in some configurations, the recovery status may be determined based on the post-restart heath check output data (as opposed to both the pre-restart health check output data and the post-restart health check output data).

In some configurations, the recovery status may be determined based on running statuses included in both the pre-restart health check output data and the post-restart health check output data. For instance, in some configurations, a first set of running statuses for each of the plurality of pods may be determined based on the pre-restart health check and a second set of running statuses for each of the plurality of pods may be determined based on the post-restart health check. The recovery status for the plurality of pods may be determined based on a difference between the first set of running statuses and the second set of running statuses. For example, when the first set of running statuses includes 6 running statuses and the second set of running statuses includes 4 running statuses, the recovery status may be determined to be unsuccessful (as two running statuses are missing, which may indicate an unsuccessful restart or reboot of those pods). Accordingly, in some configurations, the recovery status may be determined to be successful when the first set of running statuses and the second set of running statuses includes the same number of running statuses.

At operation 416, an output report may be generated. The output report may be generated as a new, blank report. Alternatively, the output report may be an existing report. In some configurations, to ensure that output reports from different script executions may be distinguished, a log prefix (e.g., as included as part of the input received at operation 406) may be affixed to the output report. In some instances, the output report (and any logs associated therewith) may be automatically uploaded, for example, to a database. The database may be the same as or different than the databases from, e.g., operation 404. Thus, the user or another user can download the results and logs at any time (e.g., into their local computer) for further usage and/or analyses. With the output report uploaded, it may then be deleted from memory (e.g., from the EC2 instance) to reduce memory utilization.

The output report may include outcomes of (or data associated with) the execution of the check(s) via the script (e.g., the pre-restart health check or the post-restart health check). For instance, the output report may include (or otherwise indicate) the pre-restart health check output data, the post-restart health check output data, or a combination thereof. Alternatively, or in addition, the output report may include network data utilized by the script. For example, the output report may include the set of pods subject to the health check(s), health status(es), recovery status(es), etc.

For example, in some configurations, FIGS. 5-7 may illustrate example output reports according to some configurations. The output report may include one or more of the examples illustrated in FIGS. 5-7. As noted herein, FIG. 5 illustrates an example table 500 of input data for the script according to some configurations. In some configurations, the table 500 may be an example of an output report. FIG. 6 illustrates an example table 600 of data associated with execution of the pre-restart health check according to some configurations. In some configurations, the table 600 may be an example of an output report. FIG. 7 illustrates an example table 700 of data associated with execution of the post-restart health check according to some configurations. In some configurations, the table 700 may be an example of an output report.

The operations of FIG. 4 are not necessarily performed one after another in a strict sequence according to the order illustrated in FIG. 4. For example, operation 404 may only be performed after (and in response to) operation 406. Moreover, in some implementations, operations 404-416 may be performed repeatedly at a predetermined interval. The predetermined interval may be set by a network operator.

Figure 8:
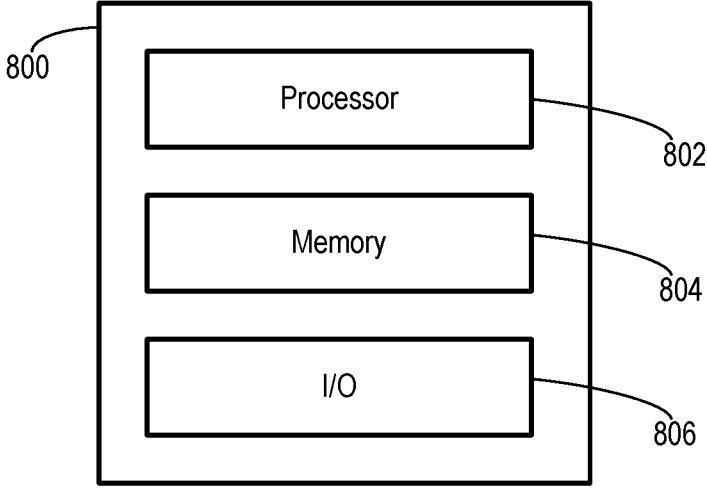
FIG. 8 illustrates an example of a control unit check management system in accordance with various aspects of the present disclosure.

The method 400 may be implemented by a device operating in a telecommunications network. For example, in a telecommunications network including a wireless access point (e.g., wireless access point 104 of FIG. 1) configured to communicate with a UE (e.g., UE 102 of FIG. 1), the method 400 may be implemented on a virtual RAN server (e.g., virtualized RAN components 106 of FIG. 1) that is operatively connected to the wireless access point. FIG. 8 illustrates one example of a virtual RAN server 800.

As illustrated, the virtual RAN server 800 comprises a processor 802, a memory 804, and an input/output (I/O) interface 806. The virtual RAN server 800 may be configured with various modules (e.g., various software modules) to implement network management functions, such as control unit check management functions. In one example, the modules may be present in the memory 804 in the form of instructions that, when executed by the processor 802, cause the virtual RAN server 800 to perform any one or more of the operations described herein. In another example, the processor 802 may be configured to load and/or execute instructions from another non-transitory computer-readable medium (e.g., cloud storage or from the memory of another device).

The virtual RAN server 800 may comprise an authentication module to authenticate a user. For example, the authentication module may determine whether a user has entered appropriate authentication information and, if so, grant the user access to perform further operations.

The virtual RAN server 800 may comprise a script initialization module to initialize the script described herein. The initialization operation may include downloading the script from a database. In the AWS implementation example, the script may be downloaded from a specific S3 bucket. By downloading the script at or near run-time, it can be ensured that the most recent version of the script is used for execution.

The virtual RAN server 800 may comprise an input parsing module to parse inputs received from a user or from another device. In user-directed implementations, the user may manually execute the script by inputting script-specific commands. In automated implementations, the input may be loaded from a local or external memory. In either implementation, the input may include at least one of an input type (e.g., region, market, AOI, gNB, etc.), an input target (e.g., a specific AWS region, one or more markets, one or more AOIs, one or more gNB, etc.), a test identifier (or log prefix), or one or more interfaces. The input may specify any input type and input target combination as desired. The test identifier (or log prefix) may be any alphanumeric string which will be prepended to or otherwise concatenated with the outputs of the script (described in more detail below), thereby to allow the outputs of different script executions to be easily differentiated.

The virtual RAN server 800 may comprise a script execution module to execute the script, as described herein. The virtual RAN server 800 may comprise a check execution module to execute one or more checks (e.g., the pre-restart health check or the post-restart health check) associated with the script, as described herein. The virtual RAN server 800 may comprise a reboot module to reboot one or more network components (e.g., the set of pods), as described herein. The virtual RAN server 800 may comprise an output report module to generate an output report, as described herein. The virtual RAN server 800 may comprise a logic module to perform arithmetic operations such as data analysis and comparison, as described herein.

The I/O 806 may include interface components to permit the communication of data to and from external devices or sources. For example, the I/O 806 may include communication ports and/or interfaces to permit communication with other computer devices. The communication ports and/or interfaces may permit input and output via wired protocols (e.g., Ethernet, Universal Serial Bus (USB), FireWire, etc.) and/or wireless protocols (e.g., Wi-Fi, Bluetooth, Near Field Communication (NFC), 5G, 4G, etc.). The I/O 806 may additionally or alternatively include communication ports and/or interfaces to permit communication with a user. For example, the I/O 806 may include interfaces for a mouse, a keyboard, a display, a graphical user interface (GUI), buttons, switches, etc. Thus, the I/O 806 may permit a user to initiate the scripts described herein on an ad-hoc basis and/or may be configured to receive instructions for the automated execution of the scripts described herein (e.g., at predetermined intervals).

Other examples and uses of the disclosed technology will be apparent to those having ordinary skill in the art upon consideration of the specification and practice of the technology disclosed herein. The specification and examples given should be considered exemplary only, and it is contemplated that the appended claims will cover any other such embodiments or modifications as fall within the true scope of the technology disclosed herein.

The Abstract accompanying this specification is provided to enable the United States Patent and Trademark Office and the public generally to determine quickly from a cursory inspection the nature and gist of the technical disclosure and in no way intended for defining, determining, or limiting the present technology disclosed herein or any of its embodiments.

What is claimed is:

1. A method, the method comprising:
initializing, with a processing system including at least one electronic processor, a script for a control unit (CU) of a telecommunication network;
receiving, with the processing system, an input, the input including a target network entity and a first CU plane;
executing, with the processing system, a first health check for a plurality of pods of the CU for the target network entity, wherein the plurality of pods are within the first CU plane;
rebooting, with the processing system, the plurality of pods;
executing, with the processing system, a second health check for the plurality of pods;
determining, with the processing system, a recovery status for the plurality of pods based on the first health check and the second health check; and
generating, with the processing system, an output report, the output report including the recovery status.

2. The method of claim 1, wherein receiving the input includes receiving an input that further includes a second CU plane.

3. The method of claim 2, wherein executing the first health check for the plurality of pods includes executing the first health check for the plurality of pods, wherein the plurality of pods are included in the first CU plane and the second CU plane.

4. The method of claim 1, wherein receiving the input includes receiving an input indicating a user plane as the first CU plane.

5. The method of claim 1, wherein receiving the input includes receiving an input indicating a control plane as the first CU plane.

6. The method of claim 1, wherein determining the recovery status for the plurality of pods includes:
determining, based on the first health check, a first set of ages for the plurality of pods;
determining, based on the second health check, a second set of ages for the plurality of pods; and
determining the recovery status for the plurality of pods based on a difference between the first set of ages and the second set of ages.

7. The method of claim 6, wherein determining the recovery status includes determining that the recovery status is successful when each age included in the first set of ages is different from each age included in the second set of ages.

8. The method of claim 1, wherein determining the recovery status for the plurality of pods includes:
determining, based on the first health check, a first set of running statuses for each of the plurality of pods;
determining, based on the second health check, a second set of running statuses for each of the plurality of pods; and
determining the recovery status for the plurality of pods based on a difference between the first set of running statuses and the second set of running statuses.

9. The method of claim 8, wherein determining the recovery status includes determining that the recovery status is successful when the first set of running statuses and the second set of running statuses includes the same number of running statuses.

10. The method of claim 8, wherein determining the recovery status includes determining that the recovery status is successful when each running status included in the second set of running statuses indicates a successful running status.

11. The method of claim 1, wherein receiving the input includes receiving an input that includes at least one of: a next-generation Node B (gNB), an area-of-interest (AOI), a market, or a region.

12. A telecommunications network comprising:

a wireless access point (WAP) configured to communicate with a user equipment; and a virtual radio access network (RAN) server operatively connected to the WAP, the virtual RAN server configured to:

initialize a recovery script associated with a control unit (CU);

receive an input, the input including a target network entity and a first CU plane;

execute a first iteration of a health check for a plurality of pods of the CU for the target network entity, wherein the plurality of pods is within the first CU plane;

after executing the first iteration of the health check, reboot the plurality of pods;

execute a second iteration of the health check for the plurality of pods;

determine a recovery status for the plurality of pods based on the first iteration and the second iteration of the health check; and generate an output report, the output report including the recovery status.

13. The telecommunications network of claim 12, wherein the virtual RAN server is configured to implement an Open RAN architecture.

14. The telecommunications network of claim 12, wherein the output report includes a first outcome dataset for the first iteration of the health check and a second outcome dataset for the second iteration of the health check.

15. The telecommunications network of claim 12, wherein the input includes a second CU plane, wherein the first CU plane is a control plane and the second CU plane is a user plane.

16. The telecommunications network of claim 12, wherein the first CU plane is either a control plane or a user plane.

17. A non-transitory computer-readable medium storing instructions that, when executed by one or more electronic processors of a computer in a telecommunications network, cause the computer to perform operations comprising:

initializing a script for a control unit (CU) of a telecommunication network;

receiving an input, the input including a target network entity and a first CU plane;

executing a first health check for a plurality of pods of the CU for the target network entity, wherein the plurality of pods are within the first CU plane;

rebooting the plurality of pods;

executing a second health check for the plurality of pods;

determining a recovery status for the plurality of pods based on the first health check and the second health check; and generating an output report, the output report including the recovery status.

18. The non-transitory computer-readable medium of claim 17, wherein determining the recovery status includes determining the recovery status of the plurality of pods based on a running status of each pod included in the plurality of pods.

19. The non-transitory computer-readable medium of claim 17, wherein determining the recovery status includes, for each pod included in the plurality of pods, determining the recovery status of the plurality of pods based on an age difference between a first age metric from the first health check and a second age metric from the second health check.

20. The non-transitory computer-readable medium of claim 17, wherein receiving the input includes receiving an input that includes a second CU plane, wherein the first CU plane is a control plane and the second CU plane is a user plane.

* * * * *